United States Patent Office 3,379,904
Patented Apr. 23, 1968

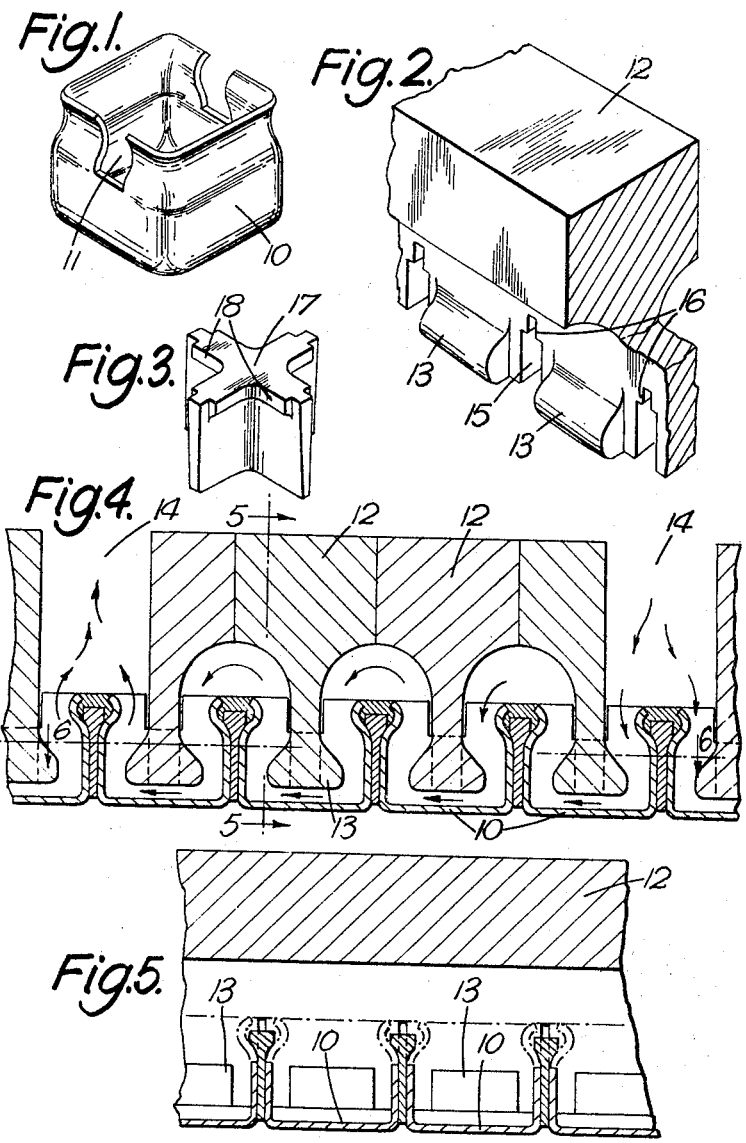

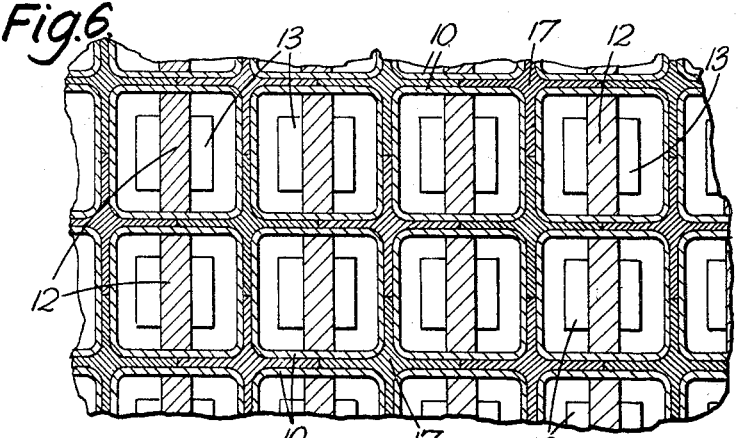
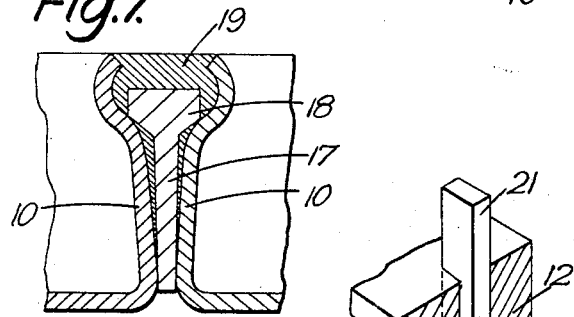
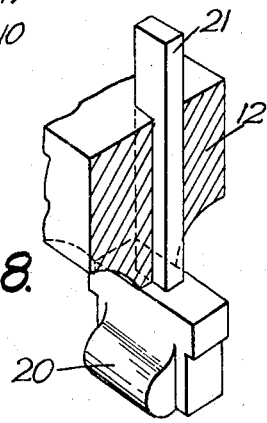

3,379,904
MAGNETOHYDRODYNAMIC APPARATUS
Peter Trevor Wallis, Beckenham, and Ralph George Gaunt, Sanderstead, England, assignors to Central Electricity Generating Board, London, England, a British body corporate
Filed Oct. 6, 1965, Ser. No. 493,467
13 Claims. (Cl. 310—11)

This invention relates to the construction of ducts for magnetohydrodynamic apparatus. It may be applied for example to magnetohydrodynamic accelerators and pumps but is more particularly applicable to electrical generators in which a hot conductive fluid is passed through a duct across which is applied a magnetic field whereby electric potentials are developed in spaced electrodes. In such a generator, the fluid temperature is usually very high, for example of the order of 3000° K. and it is necessary that the duct wall should withstand these temperatures. Moreover at least parts of the duct wall has to constitute discrete electrodes which must be insulated from one another at the duct wall surface.

It has previously been proposed to construct a duct wall for magnetohydrodynamic apparatus of a number of small metal elements, referred to hereinafter as modules, separated by thin layers of insulating material to prevent circulating currents in the wall, the modules having internal passages for the circulation of a coolant, e.g. water, into and out of each element.

The present invention is directed to an improved manner of construction of a duct using such modules facilitatig the assembly together of the modules to form a duct with interconnecting coolant passages through the modules.

According to this invention, a wall for a duct for a magnetohoydrodynamic apparatus comprises a number of metal modules of hollow form open on the face towards the outer side of the duct wall, the modules being assembled together with insulating material between them and with insulating elements each extending across at least a number of the modules, the insulating elements and modules being shaped to engage one another leaving a fluid channel between the insulating element and module leading from the corresponding channel of an adjacent module over the inside face of the part of the module facing the duct to the fluid channel of another adjacent module.

Most conveniently the modules are of generally square or rectangular form. To form the wall, they may then be assembled in rows using a bar shaped insulating element extending along each row, the bar and modules being shaped to leave a fluid channel through each module, transverse to the direction of the row so that the fluid flows from a module in one row to a module in the next row. The bars are preferably shaped so that bars of adjacent rows abut one another to form a fluid-tight assembly.

Conveniently the modules of square or rectangular form are separated by cruciform-shaped separators of electrically insulating material. The separators are preferably shaped to fit closely over the module walls so that the separators are retained in position by the modules; for example, the modules may have corners which are rounded in the general plane of the wall and the separators may be correspondingly shaped in this plane. Likewise the modules may have recesses in their sides, considered in section transverse to the plane of the wall and the separators may be shaped to engage in these recesses. The separators may be held in position by a plastic resin or similar material which will also serve as a fluid sealant for sealing the gaps between the modules. This material also forms a gas sealant to prevent any leakage from the duct.

Very conveniently each module is of cup-shaped square or rectangular form with slots in two opposite sides, which slots are engaged by a bar-shaped insulating element. The bar may be formed with portions extending down into each cup-shaped element but leaving a fluid channel extending from one non-slotted side to the other between the bar and the internal surface of the cup-shaped module.

The cup-shaped modules may be of necked construction, with parallel walls below the neck and the slots extending at least to the bottom of the neck so that a parallel sided transverse slot in the bar can embrace closely the slotted side wall of one module and the adjacent slotted side wall of the next module.

By the construction described above, the insulating elements and modules can be shaped to give a narrow section water channel over the face of the module which has to be cooled, thereby ensuring a high coolant velocity over this region, whilst giving a larger section channel elsewhere to minimise the pressure drop. A high coolant velocity over the module face is necessary in a magnetohydrodynamic generator using a hot ionized gas, as for example in an open circuit generator, because of the very high heat flux. Large quantities of water have to be used and, to minimise pumping costs, the pressure drop has to be kept as low as possible. The above construction obviates any need for separate inlet and outlet pipes to the various modules.

At convenient points, headers may be formed by slots in the aforementioned insulating elements or bars for the inlet and outlet of the coolant.

The followig is a description of one embodiment of the invention, reference being made to the accompanying drawings in which:

FIGURE 1 is a perspective view of a module;
FIGURE 2 is a perspective view of part of an insulating bar for use with modules such as that of FIGURE 1;
FIGURE 3 is a perspective view of a separator for use between modules;
FIGURE 4 is a transverse section through an assembly of modules and insulating bars;
FIGURE 5 is a section along the line 5—5 of FIGURE 4;
FIGURE 6 is a section along the line 6—6 of FIGURE 4;
FIGURE 7 is an enlarged section of a joint between modules; and
FIGURE 8 is a perspective view of part of an element for effecting electrical connection to a module.

Referring to the drawings, a duct wall for magnetohydrodynamic apparatus is built up of a number of modules 10 which are hollow square cups necked near the mouth and with slots 11 on two opposite sides. These modules are arranged with their open face facing away from the duct; the bottom face is thus exposed to the duct. In a magnetohydrodynamic generator of the open cycle type, the gas temperature may be of the order of 3000° K. but a large part of the temperature drop occurs in the boundary layer adjacent the duct wall and the modules may be at a temperature of the order of 300° C. to 400° C. It is thus possible to make the modules of stainless steel or copper and to use water cooling.

The various modules 10 are arranged in rows, each row being supported by a bar 12 of insulating material. The bars of adjacent rows abut one another closely, as shown in FIGURE 4, to form a water-tight assembly behind the modules. Each bar 12 has a series of blocks 13 along its length, one per module, the block extending into the module to leave a water channel extending from one non-slotted side wall around the block within the module to the other nonslotted side wall. This water channel is most clearly seen in FIGURE 4 and is shaped so that the portion adjacent the face of the module, which is to be cooled, is of narrow section so as to give a high water velocity. Elsewhere the water channel is of larger section to minimize the pressure drop.

Each bar 12 abuts closely against and is secured to the next bar by any convenient means (not shown) to form a fluid-tight unit or sub-assembly, the cooling water flowing into and out of the unit by means of headers 14 (FIGURE 4) formed by cutting away portions of the appropriate bars. Although in FIGURE 4, arrows are shown illustrating water flow transverse to the bars, the water can flow along the length of the bars in the region adjacent the non-slotted side walls of the modules and thus the headers can be positioned where convenient on each wall unit formed by a number of bars and their associated modules.

As shown in FIGURE 2, the bars 12 have parallel sided slots 15 with wings 16. The main part of the slot straddles the side walls of two adjacent modules below the neck and the wings fit into the slots 11 so firmly locating the modules with respect to the bar as shown in FIGURE 5.

The modules 10 are separated from one another by cruciform shaped separators 17 (FIGURE 3). Each separator has corners which fit closely around the outer radius of the corners of four modules which fit the seapartor. The separator also has heads 18 which fit into the necks of the modules thus retaining the separator in position. As shown most clearly in FIGURE 7, the flanks of the cruciform-shaped separator are tapered and the sides of the modules are also tapered to ensure a good fit even if the face of the duct has to be curved. The separators are held in position by a plastic resin or other material as shown at 19 (FIGURE 7). This material serves to seal the gaps between the modules to make the wall gas-tight, as is necessary to prevent any leakage from the duct, and also makes a water-tight joint forming the inside face of the water path between the modules.

Electrical connection may be made to any selected module, for test or other purposes, by replacing the block 13 of insulating material by a similarly shaped block 20 (FIGURE 8) made of conducting material and having a tail 21 which protrudes through the insulating bar 12. The tail thus forms an electrical connection for the associated module.

The duct wall shown in the drawings is assembled by laying the modules 10 in position, inserting the cruciform-shaped separators 17 and clamping the modules together whilst the plastic resin or other material 19 is put in the gaps between the modules. After the resin is set the wall may be tested for leaks. The clamps are now removed and the bars 12 pressed on and secured with a suitable adhesive.

An alternative method of fixing the modules 10 to the bars 12 to the slotted arrangement described above is to fix the modules by pins and/or adhesive to the bars. For security, adhesive is preferably used in the above described slotted arrangement.

We claim:
1. A wall for a duct for magnetohydrodynamic apparatus comprising a number of metal modules of hollow form open on the face towards the outer side of the duct wall, the modules being assembled together with insulating material between them and with insulating elements each extending across at least a number of modules, the insulating elements and modules being shaped to engage one another leaving a fluid channel between the insulating element and module leading from the corresponding channel of an adjacent module over the inside face of the module facing the duct to the fluid channel of another adjacent module.

2. A wall for a magnetohydrodynamic duct as claimed in claim 1, wherein the modules are of generally rectangular form assembled in rows, a bar-shaped insulating element extending along each row, the element and module being shaped to leave a fluid channel transverse to the direction of the row so that the fluid flows from a module in one row to a module in the next row.

3. A wall for a magnetohydrodynamic duct as claimed in claim 2, wherein the elements are arranged so that elements of adjacent rows abut one another, whereby a fluid-tight assembly is formed.

4. A wall for a magnetohydrodynamic duct as claimed in claim 3, wherein cruciform-shaped separators of electrically insulating material separate said modules.

5. A wall for a magnetohydrodynamic duct as claimed in claim 4, wherein the separators are shaped to fit closely over the module walls.

6. A wall for a magnetohydrodynamic duct as claimed in claim 6, wherein the modules have recesses in their sides, considered in section transverse to the plane of the wall, and wherein the separtors are shaped to engage in those recesses.

7. A wall for a magnetohydrodynamic duct, comprising a plurality of metal rectangular modules, said modules being assembled in rows and each module being open on the face towards the outer side of the duct wall, at least one bar shaped insulating element for each row of modules, said element and modules having co-operating portions forming a fluid channel transverse the direction of fluid flow along the wall, whereby fluid flows from one module in one row to a module in the next row, and a plurality of cruciform separators of insulating material, said cruciform separators being located to separate said modules.

8. A wall for a magnetohydrodynamic duct as claimed in claim 7, wherein the seapartors are sealed to the modules by a material serving as a fluid sealant for the coolant fluid and as a gas seal to prevent leakage from the duct.

9. A wall for a magnetohydrodynamic duct, comprising a plurality of metal modules, said modules being assembled in rows and each module being rectangular cup shaped and having slots in two opposite sides, at least one bar shaped insulating element for each row of modules, said element having protruding portions engaging said slots, said element and said modules having cooperating portions forming a fluid channel transverse the direction of fluid flow along the duct, and a plurality of cruciform separators of insulating materials, said cruciform separators being located to separate said modules.

10. A wall for a magnetohydrodynamic duct as claimed in claim 9, wherein the co-operating portions define a fluid channel extending from one non-slotted side to the other between the element and the internal surface of the module.

11. A wall for a magentohydrodynamic duct as claimed in claim 10, wherein the cup shaped modules are of necked construction, with parallel walls below the neck and the slots extending at least to the bottom of the neck so that a parallel sided transverse slot in the bar can embrace closely the slotted side wall of one module and the adjacent slotted side wall of the next module.

12. A wall for a magnetohydrodynamic duct, comprising a plurality of metal modules, said modules being open on the face towards the outside of the duct wall, a plurality of insulating elements disposed on the outer side of the wall and a plurality of insulating separators separating said modules, said modules and insulating elements having co-operating portions forming a narrow section channel over the faces of the modules towards the inner side of the duct wall and forming a larger section channel between said narrow section channels.

13. A wall as claimed in claim 12, wherein said insulating elements have slots formed therein, said slots defining headers for the passage of coolant fluid.

References Cited

UNITED STATES PATENTS 3,281,614   10/1966   Lindley et al. _____ 310—11

MILTON O. HIRSHFIELD, *Primary Examiner.*

D. X. SLINEY, *Examiner.*